(12) United States Patent
Merrill et al.

(10) Patent No.: US 7,648,605 B2
(45) Date of Patent: Jan. 19, 2010

(54) PROCESS FOR APPLYING A THERMAL BARRIER COATING TO A CERAMIC MATRIX COMPOSITE

(75) Inventors: Gary B. Merrill, Orlando, FL (US); Thomas B. Jackson, Portland, OR (US)

(73) Assignee: Siemens Energy, Inc., Orlando, FL (US)

( * ) Notice: Subject to any disclaimer, the term of this patent is extended or adjusted under 35 U.S.C. 154(b) by 266 days.

(21) Appl. No.: 11/804,140

(22) Filed: May 17, 2007

(65) Prior Publication Data

US 2008/0284059 A1     Nov. 20, 2008

(51) Int. Cl.
G03B 29/00 (2006.01)
B32B 27/00 (2006.01)
B32B 18/00 (2006.01)

(52) U.S. Cl. .................. 156/89.11; 156/278; 156/280; 428/325

(58) Field of Classification Search ............. 156/89.11, 156/278, 280; 428/325
See application file for complete search history.

(56) References Cited

U.S. PATENT DOCUMENTS

| | | | |
|---|---|---|---|
| 5,982,583 A * | 11/1999 | Strom ................. 360/234.3 |
| 6,013,592 A * | 1/2000 | Merrill et al. ............. 501/80 |
| 6,197,424 B1 | 3/2001 | Morrison et al. |
| 6,235,370 B1 | 5/2001 | Merrill et al. |
| 6,287,511 B1 | 9/2001 | Merrill et al. |
| 6,617,013 B2 | 9/2003 | Morrison et al. |
| 6,641,907 B1 | 11/2003 | Merrill et al. |
| 6,670,046 B1 | 12/2003 | Xia |
| 6,676,783 B1 | 1/2004 | Merrill et al. |
| 6,884,384 B2 | 4/2005 | Merrill et al. |
| 6,929,852 B2 | 8/2005 | Lane et al. |
| 6,977,060 B1 | 12/2005 | Merrill et al. |
| 6,984,277 B2 | 1/2006 | Morrison et al. |
| 7,066,717 B2 | 6/2006 | Morrison et al. |
| 7,093,359 B2 | 8/2006 | Morrison et al. |
| 2005/0008841 A1 * | 1/2005 | Schofalvi et al. ......... 428/292.1 |
| 2006/0019087 A1 | 1/2006 | Mazzola et al. |

* cited by examiner

Primary Examiner—Mark A Osele
Assistant Examiner—Nickolas Harm

(57) ABSTRACT

A method of bonding an insulation layer (26) to a CMC layer (22) by applying a compliant joining layer (24) between them in a series of steps (52-70) effective to bond the layers (22, 24, 26) with reduced differential shrinkage stresses during firing and reduced residual stresses. The CMC layer (22) and the compliant layer (24) may each be fired to an intermediate stage prior to applying the next layer (24 and 26 respectively), such that the compliant layer (24) has a remaining amount of curing shrinkage between that of the CMC layer (22) and the insulating layer (26) during a final firing stage. The insulation layer (26) may be a friable graded insulation (26F) cast as a composite of hollow ceramic spheres (26S) in a ceramic matrix (26M). The compliant layer (24) may form a checkerboard of cracks (72) oriented generally perpendicular to the layer surface that function to relax stress. The cracks define columns (74) of material that form a bond at opposed ends to the CMC layer and to the insulation respectively.

15 Claims, 3 Drawing Sheets

PROCESS FOR APPLYING A THERMAL BARRIER COATING TO A CERAMIC MATRIX COMPOSITE

FIELD OF THE INVENTION

The invention relates to ceramic matrix composite (CMC) materials, and more particularly, to bonding between a CMC structure and a thermal insulation coating.

BACKGROUND OF THE INVENTION

Engine components in the hot gas flow of modern combustion turbine engines are required to operate at ever-increasing temperatures as engine efficiency requirements continue to advance. Ceramics typically have higher heat tolerance and lower thermal conductivities than metals. For this reason, ceramics have been used both as structural materials in place of metallic materials and as coatings for both metal and ceramic structures. Ceramic matrix composite (CMC) structures with ceramic thermal insulation outer coatings have been developed to provide components with the high temperature stability of ceramics without the brittleness of monolithic ceramics. An especially effective type of ceramic thermal barrier insulation coating is described in commonly owned U.S. Pat. No. 6,197,424 which has come to be known as friable graded insulation (FGI). The coating includes a plurality of hollow oxide shapes, a binder, and at least one oxide filler powder. The oxide shapes, which may be spheres, are situated in the phosphate binder and the filler powders such that each sphere is in contact with at least one other sphere, and the arrangement of spheres is such that the composition is dimensionally and chemically stable at temperatures of approximately 1600° C. A challenge facing optimization of insulated CMC structures is the effectiveness of joining of the CMC material and the insulation layer, given that the insulation layer is typically cast onto a partially processed substrate representing a different state of process shrinkage.

BRIEF DESCRIPTION OF THE DRAWINGS

The invention is explained in the following description in view of the drawings that show.

DETAILED DESCRIPTION OF THE INVENTION

Figure 1:
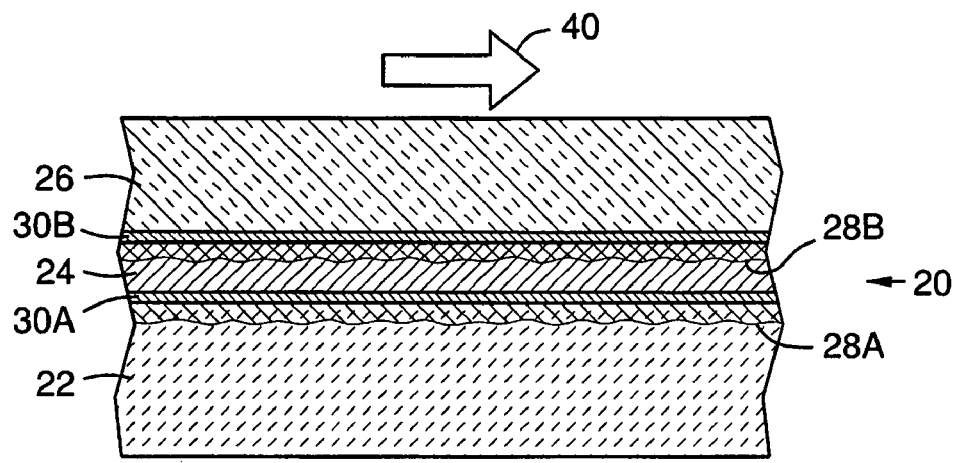
FIG. 1 is a sectional view of a CMC layer coated with thermal insulation via an intermediate compliant bonding layer according to aspects of the invention.

FIG. 1 illustrates a material system 20 including a compliant bonding layer 24 disposed between a CMC layer 22 and a ceramic insulation layer 26. The inventors found that such a material system 20 can exhibit approximately twice the bond strength between the CMC layer 22 and the insulation layer 26 when measured at room temperature compared to existing similar systems that do not include the compliant bonding layer 24 and that are not processed as described herein. Improved bonding strength can improve the survivability of the material system 20 when thermal stresses are imposed on it by thermal gradients generated by a hot combustion gas flow 40 in a gas turbine engine.

The compliant layer 24 is a layer that creates a state of intermediate process shrinkage between substrate CMC layer 22 and the ceramic insulation layer 26. The compliant layer 24 may shrink during processing, but in doing so it allows for optimized bond strength development between the substrate CMC layer 22 and the insulation overlayer 26. The matrix material of the insulation layer which bonds to the compliant layer 24 shrinks more than the CMC layer surface during processing. Any relative mismatch in shrinkage is accommodated by the compliant layer 24 and manifests itself in the form of cracks oriented perpendicular to the interface plane. The cracks are passive in terms of strength of the joint, but they accommodate differential shrinkage along the joint boundary. Without this compliant layer 24, the stress would be generated along the interface, thereby making the joint weaker. Thus, the compliant layer 24 provides an adaptation between the substrate 22 and the insulation layer 26 to improving the bonding compatibility of these layers. The adaptation is achieved by controlled intermediate curing of each layer in stages, as later described, to produce a stress relaxing geometry of cracks and columns within the compliant layer 24.

Figure 2:
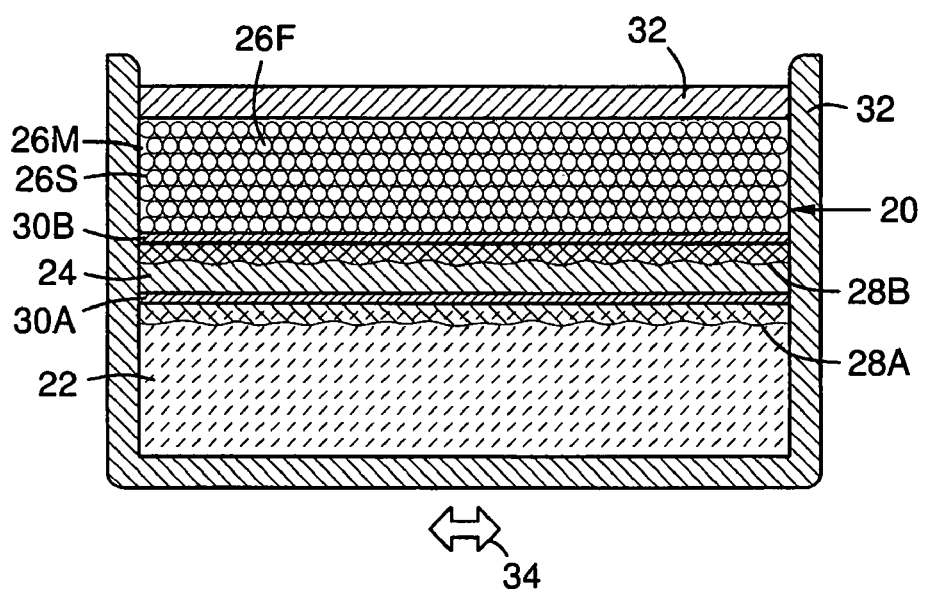
FIG. 2 is a sectional view of a CMC material system such as that of FIG. 1 shown in a stage of casting the insulation layer.

FIG. 2 illustrates casting of a friable graded insulation material 26F containing hollow ceramic spheres 26S in a matrix 26M onto a CMC layer 22 by placing the CMC layer 22 with previously applied binders 28A, 28B, primers 30A, 30B, and a compliant layer 24 in a cavity of a casting tool 32 and vibrating 34 the tool for compaction of the spheres 26S prior to final drying and firing of the material system 20.

Figure 3:
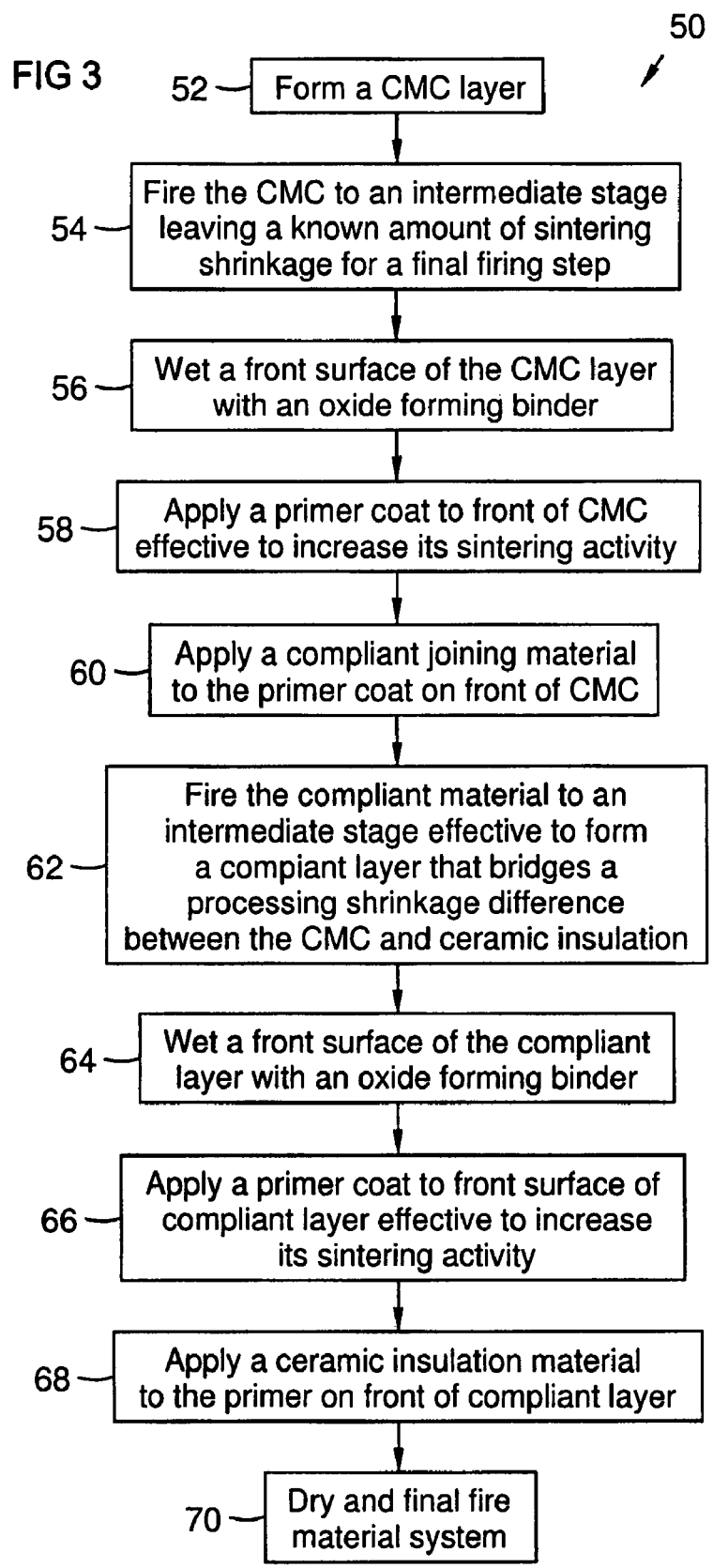
FIG. 3 is a flow chart of a process that may be used to produce a material system such as that of FIG. 1 or FIG. 2.
Figure 4:
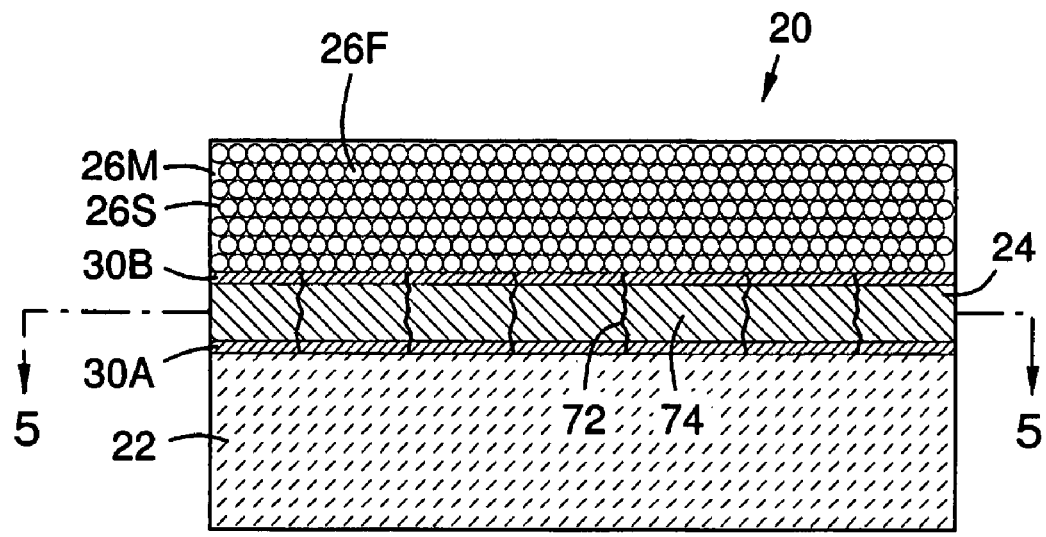
FIG. 4 is a sectional view illustrating stress relaxation cracks in the compliant bonding layer.

FIG. 3 illustrates a process 50 that produces a material system 20. First, a CMC material 22 is formed 52 into a layer and is fired 54 to an intermediate bisque fired stage of curing. This pre-sets an amount of sintering shrinkage that will occur in the CMC layer during a final curing stage after the insulation layer 26 is applied. Next, a front surface of the CMC layer 22 may be soaked 56 with an oxide forming binder 28A to prevent unevenness or coagulation of a later-applied primer 30A. Next, a thin primer coat 30A is applied 58 to the front surface of the CMC layer 22 effective to increase sintering activity of the front surface of the CMC layer. Next, a compliant joining material 24 is applied 60 to the front surface of the CMC layer 22 over the primer coat 30A, and is fired 62 to an intermediate temperature effective to produce a compliant joining layer 24 with a remaining amount of final curing shrinkage between that of the CMC layer 22 and that of the insulation layer 26, 26F. The compliant joining material 24 may be a constituent of the overlying thermal insulation material 26; for example in an embodiment where the insulation material 26 is an FGI material as described in U.S. Pat. No. 6,197,424, the compliant joining material 4 may be the same composition that forms the binding matrix in the FGI material. The drying and partial firing of the compliant layer 24 results in differential shrinkage between the compliant layer 24 and the underlying CMC layer 22. Because the compliant layer 24 is so thin, the differential shrinkage is accommodated without any buildup of stress along the interface by the formation of cracks 72 in the compliant layer, as illustrated in FIG. 4. Next, an exposed front surface of the compliant joining layer 24 is wetted 64 with an oxide forming binder 28B, and then a primer coat 30B is applied 66 to the front surface of the compliant joining layer 24 effective to increase sintering activity of the front surface of the compliant joining layer. A ceramic insulation material 26, 26F is then applied 68 over the primer coat 30B on the front surface of the compliant joining material 24. This insulation may be applied by casting after placing the CMC in a tooling cavity 32. The insulation 26, 26F may be a friable graded insulation (FGI) 26F as described in U.S. Pat. No. 6,197,424 which is incorporated by reference herein. The insulation 26, 26F may be vibrated 34 for compaction during casting as described in commonly owned U.S. Pat. No. 6,977,060 which is also incorporated by reference herein. Finally, the material system 20 is dried and fired 70 under controlled conditions to finally cure and bond the layers. This process provides greatly improved bonding of the insulation 26, 26F to the CMC 22, as mentioned above, by reducing differential shrinkage stresses during processing, by optimizing the intimacy between adjoining materials, and by reducing residual stresses arising from shrinkage mismatch at the interface region during processing through the stress-relieving action of the cracks 72.

In steps 56 and 64 the substrate is wetted to prevent drying of the primer 30A and the compliant material 24. To achieve this, the substrate may be saturated in an oxide forming binder material 28A such as an aluminum oxychloride solution yielding about 10% solids. The weight of the substrate 22 may be taken at both the dry and saturated conditions. Then the substrate may be dried back to between about 55% and 85% of the saturated weight gain, to achieve a desired degree of saturation. For example:

Target CMC weight gain=(Saturated weight−Dry weight)×0.75

After the target weight gain is reached, the CMC substrate 22 is ready for an initial application 58 of the primer 30A. The primer may be a slurry of fine alumina powder and aluminum oxychloride solution. The fine alumina powder may have one or more particle sizes in the range of 0.1-0.3 microns for example. The best results mentioned above were achieved using alumina powder with a nominal particle size of 0.1 microns forming about 5-10% by weight of the slurry. The fine alumina powder may be mixed in the oxychloride solution, and the resulting slurry may then be uniformly applied 58 to the front surface of the CMC substrate 22, such as by brushing or mist spraying. A target thickness of this primer coat 30A may be about 50 microns. Assuming a uniform dispersion of the fine powder in the slurry and an even distribution of the primer on the CMC surface, a calculated weight of the slurry can be applied to the surface of the CMC 22 to achieve the required thickness. After the primer has been absorbed into the CMC substrate, the compliant joining layer 24 can be applied to the front surface of the CMC substrate 22 on the primer coat 30A.

The compliant joining material 24 may be a mixture of alumina powder in an aluminum oxychloride solution. The alumina powder particles may have a distribution of sizes for example from about 0.1 to 30 microns, or may be a mix of fine (for example 0.1-0.3 microns) powder and coarse (for example 10-30 micron) powder. The best results mentioned above were achieved using a combination of 25-29 wt. % of 0.1 micron fine powder and 71-75 wt. % of 10-15 micron coarse powder, these alumina powders together forming about 96% of the as-cured weight of the coating. The compliant joining layer 24 may be applied, dried, and then sanded back to a target weight that indicates a desired thickness. A suggested thickness range is about 300-500 microns. Alternately, the compliant layer 24 may be applied with a metering knife or spray or other known means. After the compliant layer is applied and dried, it may be fired to an intermediate stage of curing that leaves a predetermined amount of shrinkage for a final curing stage. This remaining predetermined shrinkage may be an amount between that of the CMC 22 and that of the insulation material 26, 26F in final firing, thus minimizing differential shrinkage stresses in final curing. A temperature for the intermediate stage of curing the compliant layer 24 that has been found effective for this goal is 1100° C. for a hold time of about 1 hour.

The compliant layer may be wetted 64 with an oxide forming binder 28B as previously described for the first application 56 of binder 28A. This second binder application 64 may use the same binder composition as in the first application 56. Then a second primer coat SOB may be applied 66 as previously described for the first application 58 of primer coat 30A. The second primer application 66 may use the same primer composition as in the first application 58. Then the insulation layer 26 may be applied for example by casting an FGI material 26F on the CMC surface as in FIG. 2. The binding matrix 26M of the FGI material 26F may have the same composition as the compliant layer 24. Final curing 70 of the material system 20 may include firing at about 1300° C. or between 1250° C. and 1340° C. for about 3 hours.

Figure 5:
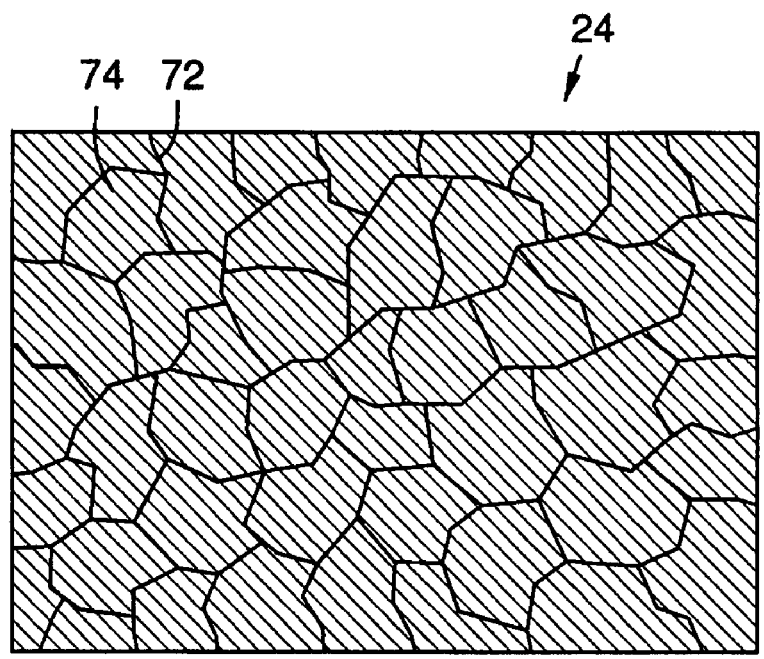
FIG. 5 is a sectional view along line 5-5 of FIG. 4.

FIGS. 4 and 5 illustrate a geometry of cracks 72 that may form during processing of the compliant layer 24, producing a checkerboard of columns 74 in the compliant layer. These cracks 72 relax stress along the boundary between the substrate 22 and overlying insulation layer 26 and provide compliance to the differential processing shrinkage. Each column 74 thus provides low stress bonding at one end to the CMC layer 22, and at the other end to the insulation layer 26. Residual stress that would normally occur across a bond between the substrate 22 and the insulation layer 26 is relieved by these cracks 72. This causes little or no reduction of the strength of the compliant layer because the cracks 72 form generally perpendicularly to the layers 22, 24, 26, and thus do not separate them, but instead define columns that bridge them. While some of the cracks may be at least partially filled by subsequent process steps, it has been found that an effective number of cracks remain or are reformed to provide the desired compliance.

The insulation 26 may be formed of any type of low thermal conductivity material known in the art, such as a fibrous insulation, a ceramic thermal barrier coating (TBC) material as may be used in known gas turbine applications, or the high temperature insulation described in U.S. Pat. No. 6,197,424, as examples. The terms thermally insulating material, layer of insulation, thermal insulation, insulation, insulating layer, etc. are used herein to include materials that are applied to a high temperature side of a CMC component in order to increase the allowable operating temperature of the component to beyond the upper temperature limit of the CMC material itself.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of bonding an insulation layer to a CMC layer, comprising:
    forming a layer of CMC material;
    applying a layer of joining material to a front surface of the CMC layer;
    partially curing the layer of joining material to form a plurality of stress-relieving cracks in the joining material, the cracks oriented generally perpendicular to the front surface;

applying a layer of an insulation material to a front surface of the joining layer opposed the CMC layer; and drying and final firing the CMC layer, the joining layer, and the insulation material together under controlled conditions effective to finally cure and bond them together, forming a material system.

2. The method of claim 1 further comprising:

firing the CMC layer to an intermediate stage of curing prior to applying the joining material, the CMC intermediate stage of curing being effective to leave a known amount of sintering shrinkage in the CMC layer for a final firing stage; and drying and firing the joining material to an intermediate temperature and time prior to applying the insulation material, the intermediate temperature and time being effective to produce a compliant joining layer with a known remaining amount of curing shrinkage that is between the known amount of sintering shrinkage in the CMC layer and a known amount of curing shrinkage in the insulation layer.

3. The method of claim 1, further comprising the step of selecting the joining material to have a composition the same as that of a constituent of the insulation material.

4. The method of claim 2, wherein the insulation material comprises a plurality of hollow ceramic spheres disposed in a binding matrix material, further comprising the step of selecting the joining material to have a composition the same as the binding matrix material.

5. A method of bonding an insulation layer to a CMC layer, comprising:

forming a layer of CMC material;

firing the CMC layer to an intermediate stage of curing effective to leave a known amount of sintering shrinkage for a final firing stage;

wetting a front surface of the CMC layer with an oxide forming binder;

applying a first primer coat to the front surface of the CMC layer that is effective to increase sintering activity of the front surface of the CMC layer;

applying a joining material to the first primer coat on the front surface of the CMC layer;

drying and firing the joining material to an intermediate stage effective to produce a joining layer that comprises a plurality of cracks oriented generally perpendicular to the front surface of the CMC layer;

wetting a front surface of the joining layer with the oxide forming binder;

applying a second primer coat to the front surface of the compliant joining layer that is effective to increase sintering activity of the front surface of the joining layer;

applying an insulation material to the second primer coat on the front surface of the joining layer; and drying and final firing the CMC layer, the joining layer, and the insulation material together under controlled conditions effective to finally cure and bond them together forming a material system, the plurality of cracks in the joining layer effective to relieve differential shrinkage stress between the CMC layer and the insulation material.

6. The method of claim 5 wherein the step of wetting the front surface of the CMC layer with the oxide forming binder and the step of wetting the front surface of the joining layer with the oxide forming binder each comprise partially drying the respective wetted surface to between 55% and 85% of a weight gain caused by the oxide forming binder before said partial drying.

7. The method of claim 6 wherein the oxide forming binder comprises an aluminum oxychloride solution yielding about 10% solids.

8. The method of claim 5 wherein each of the primer coats comprises a slurry of an aluminum oxychloride solution and an alumina powder comprising a particle size distribution in a range of about 0.1-0.3 microns.

9. The method of claim 8 wherein the alumina powder has a nominal particle size of about 0.1 microns.

10. The method of claim 8 wherein the first primer coat is applied to a thickness of about 50 microns.

11. The method of claim 5 wherein the joining material comprises a mixture of an aluminum oxychloride solution and an alumina powder comprising a particle size distribution in a range of about 0.1-30 microns.

12. The method of claim 11 wherein the alumina powder in the joining material is a combination of a fine alumina powder with a nominal particle size in a range of about 0.1-0.03 microns and a coarse alumina powder with a nominal particle size in a range of about 10-30 microns.

13. The method of claim 11 wherein the alumina powder in the joining material is a combination of 25-29 wt % alumina powder with a nominal particle size of about 0.1 microns and 71-75 wt. % alumina powder with a nominal particle size of 10-15 microns.

14. The method of claim 5 wherein the intermediate firing temperature of the joining layer is about 1100° C. for a hold time of about 1 hour.

15. The method of claim 5 wherein the insulation material comprises hollow ceramic spheres in a matrix, the matrix comprising a composition the same as that of the joining material, and wherein the insulation material is cast by placing the CMC layer with the previously applied binders, primers, and joining layer into a tool cavity in which the insulation material is compacted onto the primer coat on the front surface of the joining layer, then finally curing the material system at between 1250° C. and 1340° C. for about 3 hours.

* * * * *